Patented Apr. 16, 1935

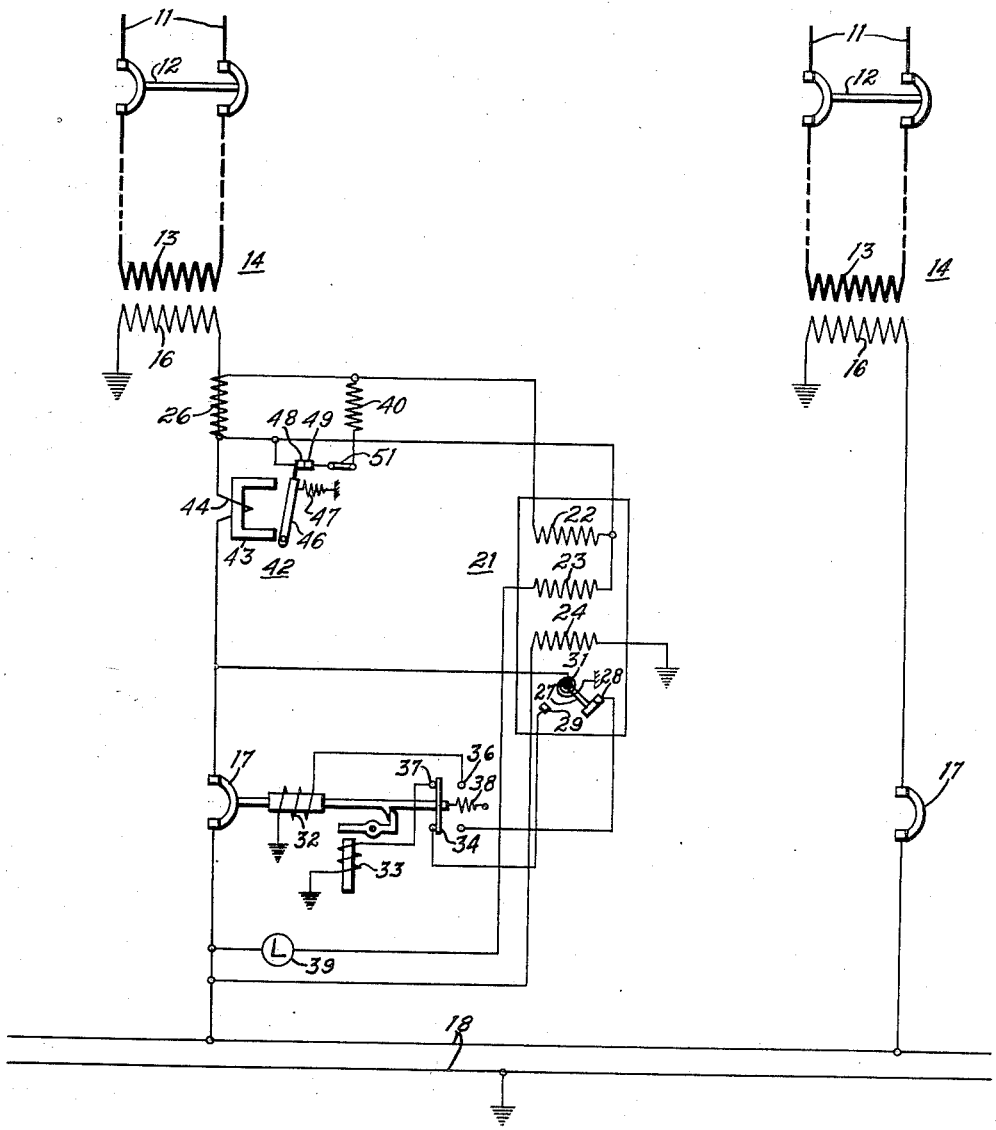

1,997,647

UNITED STATES PATENT OFFICE 1,997,647

NETWORK DISTRIBUTION SYSTEM

Gordon Ross Milne, Bloomfield, N. J., assignor to Westinghouse Elec. & Mfg. Company, a corporation of Pennsylvania Application August 23, 1930, Serial No. 477,348

10 Claims. (Cl. 175—294)

My invention relates to electrical systems of distribution and particularly to alternating-current distribution systems wherein a low-voltage network or grid is fed by a plurality of high-voltage feeders through step-down or distribution transformers.

In a network distribution system of this general type, it is mandatory that the network load be supplied continuously, even though the disconnection of one or more of the feeders is necessitated by the occurrence of faults therein. To provide a highly effective and efficient system of distribution, a synchronized-at-the-load-type system has been developed which insures good continuity of service by interconnecting different power sources through a common network load.

Network protectors are provided in the secondary circuits of each of the feeders for the purpose of connecting and disconnecting a feeder from the network load on the occurrence of a feeder fault or the disconnection of a supply source from service. The usual network protector includes a network circuit interrupter controlled by a sensitive directional relay. The feeder circuit is adapted to be connected to the network load only when the energy flow is from the feeder to the network and is automatically disconnected from the network load when the energy flow is in the reverse direction.

Serious troubles are encountered in certain systems because of the frequent actuation of the network protector, as a result of pronounced load variations at times of light load. Such load variations occur as a result of elevator loads or similar fluctuating load apparatus connected to the network. Another condition, giving rise to frequent protector operation, is that resulting from load balance and circulating currents between feeders connected to the same loads, or concentrated load networks under light-load conditions. This objectionably frequent protector operation, under such conditions as are above mentioned, must be remedied in order to provide the best possible service to the consumer and to minimize the operating company's maintenance cost.

I propose to obviate these difficulties and thereby provide a satisfactory and simple protector adaptable to existing network systems and future network applications.

It is an object of my invention, therefore, to provide an insensitive network protector without sacrificing its reliability of operation.

Another object of my invention is to provide a high reverse-current setting for a network protector, under normal conditions, and a low reverse-current setting under fault conditions.

Another object of my invention is to provide a network protector the reverse-current setting of which may be regulated in accordance with any particular system-application conditions.

Other objects and advantages of my invention will become apparent from a practical embodiment thereof, as illustrated in the accompanying drawing.

In accordance with my invention, I propose to provide means whereby a network relay of a usual type may be made relatively insensitive to to the flow of reverse energy or power flow from the network to the feeder, under normal conditions of system operation, and substantially instantaneous or high-speed operation under feeder-fault conditions on the primary side of the feeder transformer. Since faults occurring on the network load are permitted to burn themselves clear, or are isolated by local protective apparatus, the network protector is only required to be actuated upon the occurrence of feeder faults or transformer failures.

As hereinbefore mentioned, fluctuating load conditions result in reversals of power flow and the delivery of energy from the network to the distribution transformer. Since the usual network-protector relay is positively energized to actuate the network switch for even small reversals of power flow, it has been found impractical to utilize such sensitive relay for network protection, under light-load conditions on the system.

The requirement for continuous and satisfactory service to the network loads has been solved by feeding the network from a plurality of feeders connected to different generating or central stations. Thus, upon the failure of one or more feeders or generating stations, the network load will be supplied from the remaining feeders. Such a system of distribution is characterized as a synchronized-at-the-load system, and the resultant flow of circulating currents between the feeders, and the tendency to equalize the load on the respective feeders, simulates, in effect, a reversal of power flow, and the usual sensitive directional relay responds to isolate its associated feeder. Immediately, however, the conditions between the feeder and the network may change so as to be proper for effecting the flow of power to the network load, whereupon the feeder will be again connected to the network only to be reopened again when the original conditions are reestablished. This frequent operation of the network switch is very objectionable from the standpoint of wear and maintenance of the network switches and the resulting voltage fluctuation of the consumer's service. Further, frequent operation will cause a network protector to fail and remain open, thus producing low voltage on the network and overload on adjacent equipment.

In my invention, I propose to utilize a sensitive directional relay of the usual type and to render it insensitive to small power reversals resulting from fluctuating loads, circulating currents and the like. On the occurrence of a feeder fault, however, the relay will respond, substantially without delay, to isolate such faulty feeder.

In the single figure of the drawing, I have shown a network distribution system and an insensitive network protector, associated with one of the feeders, for controlling the connection of the feeder to the network. For purposes of clarity, a single-line representation of the system and protector arrangement is utilized.

Referring more particularly to the drawing, a plurality of feeders 11, energized from the same or different sources, are connected to the primary windings 13 of distribution transformers 14 through the feeder, or central station, circuit-breakers 12. The transformer secondary windings 16 have one terminal thereof connected to ground and the other respective terminals are connected to a common network 18 through network switches or circuit-breakers 17.

Since the network-protector system is similar for all of the respective feeders, I have shown an embodiment of my invention associated with only one feeder circuit and network switch.

A network relay 21, of a usual induction type, which, for clearness, is illustrated schematically having a current winding 22, a phasing winding 23 and a voltage winding 24, is electrically associated with the secondary circuit of the distribution transformer 14 and the network side of the network switch 17. The current winding 22 is connected across the secondary winding of a current transformer 26; the current transformer being connected in the secondary circuit of the transformer 14 between the network switch 17 and the transformer secondary 16. The phasing winding 23 has its terminals connected to the network side and to the transformer side of the network switch 17, respectively. The voltage winding 24 has the terminals thereof connected to the network side of the network switch 17 and to ground, respectively.

The network relay 21 is, therefore, under normal system-operating conditions, energized in accordance with the current flowing in the secondary circuit of the transformer 14, and the voltage of the network 18.

The relay 21 is provided with a moving contact 27 and stationary contacts 28 and 29. The moving contact 27 is normally biased by a coiled spring 31 to complete a circuit through stationary contact 28. Assuming the relay 21 to be of the induction-disc type, the fluxes of the several windings 22, 23 and 24 combine, under various conditions, to produce a rotating torque on the disc armature means to which the moving contact may be mechanically connected. Under normal conditions, or when the power flow is from the feeder 11 to the network 18, the fluxes produced by the current coil 22 and the voltage coil 24 combine to maintain the contacts 27 and 28 in their normal closed position. Upon a reversal of power flow, however, that is, power flow from the network 18 to the feeder 11, the torque produced by the fluxes of the current winding 22 and the voltage winding 24 combine to actuate the disc armature means to rotate the contact 27 into engagement with the stationary contact 29.

The network switch 17 is provided with closing and opening coils 32 and 33, respectively, and a pallet switch 34 which is adapted to complete a circuit between contacts 36 and contacts 37 when the network switch 17 is in its opened and closed positions, respectively. The network switch is normally biased to its open position by the spring 38.

Assuming the network 18 to be deenergized and it is desired to furnish power thereto, the operation sequence of the network relay 21 and the network switch 17 is automatic to effect the connection of the distribution transformer 14 to the network 18. When the network 18 is deenergized, the feeder circuit breaker 12 and the network switch 17 are in their open positions, and the pallet switch 34 of the network switch 17 completes the circuit across contacts 36.

The operator or attendant at the central station, or other power source, effects the closure of the circuit breaker 12, whereupon the distribution transformer 14 is energized. A secondary circuit is completed from the ground connection of one terminal of the transformer secondary winding 16, the secondary winding, relay contacts 27—28, contacts 36 and the pallet switch 34 of the network switch 17, closing coil 32 and thence to ground. The coil 32 is, therefore, energized to effect the closure of the network switch 17 and provides an electrical connection from the feeder 11 to the network 18 through the network switch 17. Under such conditions, the current winding 22 and the voltage winding 24 of the network relay 21 are energized to produce a resultant torque acting to keep the relay contacts 27 and 28 in their normal closed position. Since only one feeder 11 is connected to the network 18, there can be no reversal of power flow and, consequently, the network switch 17 remains in its closed position.

When the network 18 is energized and it is desired to connect an additional feeder 11 thereto, the associated network switch 17 is maintained in its open position by the biasing spring 38 and the torque produced by the windings of relay 21. The attendant at the power source effects the closure of the feeder circuit breaker 12 to energize the primary winding 13 of the distribution transformer 14. Since the network switch 17 is in its open position, there is no current flowing in the secondary circuit of the transformer 14, and the current winding 22 of the network relay 21 remains deenergized.

The voltage winding 24 of the relay is energized by the network voltage, and the phasing winding 23 is connected across the open contacts of the network switch 17 and is, therefore, energized in accordance with the resultant of the transformer voltage and the network voltage. A phasing lamp 39 is connected in series with the phasing winding for protection against heavy over-currents. In the event that the network voltage is of greater magnitude than the transformer voltage, the fluxes of the phasing winding 23 and the voltage winding 24 cooperate to produce a torque to rotate the contact 27 away from the stationary contact 28. The voltage winding 24 is provided with a biasing means, not shown, whereby the torque of the spring 31 tending to maintain the contacts 27—28 in engagement, is overcome when the voltage winding 24 is energized. As is well known in the prior art, the phasing winding 23 may be designed to produce a flux, which, when combined with the flux produced by the voltage winding 24, effects the rotation of the contact 27 away from the contact 28 when the magnitude of the transformer voltage is equal to, or less than, the magnitude of the network load voltage.

When the proper magnitude and phase position of the transformer and network voltages exist across the open contacts of the network switch 17, the phasing winding 23 is no longer effectively energized to cause movement of the contact 27 away from the stationary contact 28, thereby permitting the closing coil 32 to be energized by the transformer voltage. The energization of the closing coil 32 causes the network switch to be closed, and the feeder 11 is then connected to the network 18 through the distribution transformer 14, and supplies power to the network load.

As referred to hereinbefore, any small reversal of power flow from the network 18 to the feeder 11, will, ordinarily, cause a sensitive directional relay 21 to be actuated to close its contacts 27—29 and complete a circuit through the pallet switch 34, contacts 37 and the opening coil 33. The relay torque tending to close contacts 27—29 is the resultant of the fluxes of the current winding 22 and the voltage winding 24 only when the flow of energy is toward the feeder circuit; the relay torque produced by the fluxes of these two windings, under normal conditions, being such as to rotate the contact 27 towards the stationary contact 28.

I propose to render the network relay 21 insensitive to small reversals of power while providing for substantially instantaneous operation thereof on the occurrence of feeder faults or failure of the distribution transformer. Since the relay torque operating to close the relay contacts 27—29, to thereby energize the trip coil 32 of the network switch 17, is the resultant of the fluxes produced by the current winding 22 and the voltage winding 24, a means for decreasing the effective energization of the current winding will limit the torque of the relay to a correspondingly smaller value.

For the purpose of limiting the amount of current which may flow in the current winding 22 of the network relay, I have provided a reactor or shunt 40 in parallel with the secondary winding of the current transformer 26. This shunt 40 may be designed to limit the value of current flowing in the current coil 22 to any desired value, and, for purposes of explanation, I will assume that the shunt 40 is designed to carry about 90 per cent of the total current transformed by the current transformer 26. The current coil 22 is, therefore, energized by only one-tenth of its normal effective value of energization and, obviously, small reversals of power will not materially increase the effective relay torque to close the relay contacts 27—29.

Assuming the reactor shunt 40 to be permanently connected in parallel with the current winding 22, a reverse current of slightly more than ten times the normal transformer secondary current would have to flow in order to effectively energize the current winding 22. However, in various systems of distribution, reverse energy flow of varying magnitude may be permitted without resulting harm or serious disadvantage to the operation of the system, as a whole. The effect of fluctuating loads, load balance and circulating currents may be decidedly more pronounced in some systems, and even in different portions of the same system, than in others. As a result, therefore, the permissible value of reverse-energy flow is dependent upon the location, capacity and other characteristics of the feeder to be protected and its associated network load.

The usual network relay may be adjusted to be effectively energized to close its tripping contacts on in-phase reversals of from one to ten amperes, primary current. With the shunt reactor 40 connected in parallel with the current winding 22, and assuming the network relay 21 to be adjusted to close its contacts 27—29 on an in-phase reversal of two amperes, primary current, an in-phase reversal of twenty amperes, current through the primary of current transformer 26 will be required before the tripping contacts 27—29 will close. It is obvious, therefore, that any desired reverse current setting may be secured by properly designing the shunt reactor 40.

Reliable and high-speed operation of the network relay 21 is necessary under the various fault conditions which are encountered on the system. In order to secure this substantially instantaneous response of the relay, it is necessary to remove the shunt reactor 40 from the circuit when a fault occurs.

To effect the removal of the shunt reactor 40 from the circuit, a cut-out 42 is provided. This cut-out comprises a magnetic yoke 43 provided with a single-turn coil 44 which is serially connected between the transformer secondary 16 and the break contacts of the network switch 17. An attractable pivoted armature 46 is normally biased away from the yoke member 43 by a spring 47. A contact 48 is carried by the armature 46 and, in the biased position of the armature 46, this contact engages a fixed contact 49. Contact 48 is connected to one terminal of the secondary winding of current transformer 26, and the stationary contact 49 is connected to one terminal of the shunt reactor 40 through a link or switch 51. The other terminal of the shunt reactor 40 is connected to the other side of the secondary winding of the current transformer 26. Under normal conditions, therefore, and with the armature member 46 in its biased position, the contact 48 engages contact 49 to place the shunt reactor 40 in parallel with the current winding 22 of the relay 21.

As previously stated, the value of permissible reverse energy depends upon the system characteristics. The operating or pick-up point of the cut-out 42 may be varied by varying the number of turns of the coil 44, changing the position of the armature member 46, changing the strength of the spring 47 and other obvious alterations and modifications. Since the cut-out operates only in accordance with the current flowing in the transformer and does not take into consideration the direction of the power flow, it is desirable to choose the pick-up and drop-out values as close together as possible. Obviously, the drop-out value should always be above the value of current for which the relay 21 is set to trip when the shunt reactor 40 is in circuit with the current winding 22. Usually, the cut-out 42 is set to operate when the primary current has reached a value equal to 150 to 200 per cent of the rating of the network switch 17. This operating value may be altered to any desired value, depending upon the nature of the fault encountered, and the particular system characteristics involved.

Assuming the cut-out 42 to be set to operate when the primary current reaches a value equal to 150 per cent of the rating of the network switch 17, under normal operating conditions, the contacts 48 and 49 are engaged, and the shunt reactor 40 is connected in parallel with the current winding 22. The network relay 21 is rendered insensitive to small values of power reversal and, therefore, tends toward stable system operation. Under fault conditions, or when the current through the network switch 17 reaches a value of 150 per cent of its rating, or some greater value, the cut-out 42 operates to pick up its armature 46 and break the connection of the contacts 48 and 49. The shunt reactor 40 is thereby disconnected from the circuit and the network relay 21 acts as a sensitive directional relay to provide fast and reliable operation under primary fault conditions.

Under such fault conditions, or for prohibitive values of primary current, the shunt reactor 40 is disconnected from the relay circuit, and the normally insensitive network relay 21 becomes a sensitive directional relay which acts to close its contacts 27—29 to complete the tripping circuit of the network switch 17 by completing the energizing circuit for the trip coil 33. Since the cut-out 42 responds to excess current values without reference to the direction of energy flow, the shunt reactor 40 will be disconnected from the circuit for excess flow of current when the energy flow is from the feeder 11 to the network 18. However, since the network relay 21 is directional, the additional relay torque will act to keep the contacts 27—28 in engagement.

The values of the high reverse-current setting, under normal conditions, are determined by the design of the shunt reactor 40 and the reverse-current adjustment of the relay 21. Briefly, my invention provides that the network protector shall have a high reverse-current setting under normal conditions and a low reverse-current setting under fault conditions, and the point at which the change is made in setting depends upon the point at which the cut-out 42 is set to operate.

The use of the system described may be rendered optional by including the switch 51 in series with the stationary contact 49 and one terminal of the shunt reactor 40. With the switch 51 in its closed position, the protector arrangement is rendered normally insensitive. With the switch 51 opened, the network relay 21 acts as a sensitive directional relay under all system conditions.

Ordinarily, the shunt reactor 40 should be designed to have substantially the same power factor as the current winding 22 of the relay 21 in order that the characteristics of the relay may not be changed by connecting the reactor 40 in parallel with the current winding 22. However, by varying the power factor of the reactor circuit, the phase-angle characteristics of the relay may be changed considerably, and it is usually desirable to so design the shunt reactor 40 that the tripping curve of the network relay 21 will be rotated approximately 10 to 30 degrees in the clockwise direction, or from the true wattmeter position. This precaution is particularly advantageous in the event of failure of the cut-out 42 to operate, in which case, the operation of the network relay 21 will be more reliable on reversals of low lagging power factor.

An important feature of my invention is that no additional contacts are required in series with the tripping contacts 27 and 29 in the trip circuit of the network switch 17. It is also obvious that, if the cut-out 42 fails to operate or the reactor 40 becomes open circuited, the network relay 21 will still be actuated to engage its tripping contacts 27—29, in the event of a primary fault. It is clear, therefore, that I have provided a high reverse-current setting for the network protector without sacrificing its reliability of operation.

I have described my invention with reference to a single-line diagram but it is obvious that it may be applied to any polyphase distribution system utilizing single-phase or polyphase network relays and various modifications of the cut-out. In practice, the iron circuit of the cut-out 42 is usually placed around the pole of the network switch 17, the pole of the switch acting as a single-turn coil.

Obvious changes and modifications of my invention may be made without departing from the spirit and scope thereof, and I desire that only such limitations shall be placed thereon as are indicated in the appended claims and are imposed by the prior art.

I claim as my invention:

1. In an alternating-current system of distribution, a network circuit, a plurality of transformers for supplying power to said network circuit, a plurality of circuit breakers for controlling the connection of said transformers to said network circuit, and control means for each of said circuit breakers, each of said control means including normally insensitive power directional means for controlling the opening of the corresponding circuit breaker and means responsive to a predetermined current condition through the corresponding circuit breaker for increasing the sensitiveness of said directional means in response to a current condition of predetermined value.

2. In protective apparatus for an alternating current circuit, a circuit breaker, power-directional means for causing said circuit breaker to open in response to directional power flow in excess of a predetermined value in said circuit, and means responsive to a predetermined current condition of said circuit for modifying the operation of said directional means to cause said circuit breaker to open in response to directional power flow less than said predetermined value when said current condition exceeds a predetermined value.

3. In an alternating-current system of distribution, a plurality of feeders, a network circuit, a plurality of transformers for supplying power from said feeders to said network circuit, a plurality of circuit breakers for controlling the flow of power through said transformers, and control means for each of said circuit breakers, each of said control means including a device operable in response to an electrical condition within a predetermined range of values for causing the corresponding circuit breaker to open upon the occurrence of a predetermined condition of the associated feeder, and means responsive to a predetermined current condition through the corresponding circuit breaker for modifying the operation of said device to cause operation thereof in response to an electrical condition within a different range of values under fault conditions of the corresponding feeder.

4. In protective apparatus for an electric circuit, a circuit breaker, relay means for causing said circuit breaker to open in response to an abnormal condition of said circuit, said relay means including a winding energized in accordance with a current condition of said electric circuit, an impedance shunt circuit connected in parallel to said winding and arranged to normally reduce the current flow therein, and means responsive to an abnormal current condition of said electric circuit for reducing the effectiveness of said shunt circuit to thereby increase the sensitiveness of said relay means during abnormal current conditions of said electric circuit.

5. In protective apparatus for an electric circuit, a circuit breaker, relay means for causing said circuit breaker to open in response to an abnormal condition of said circuit, said relay means including a winding energized in accordance with a current condition of said electric circuit, an impedance shunt circuit connected in parallel to said winding and arranged to normally reduce the current flow therein, and a cut-out device responsive to an abnormal current condition of said electric circuit for interrupting said shunt circuit to thereby increase the sensitiveness of said relay means during abnormal current conditions of said electric circuit.

6. In protective apparatus for an electric circuit, a circuit breaker, power-directional relay means for causing said circuit breaker to open in response to directional power flow in excess of a predetermined value in said circuit, and over-current means for modifying the operation of said relay means to cause said circuit breaker to open in response to directional power flow less than said predetermined value when the current in said circuit exceeds a predetermined value.

7. In protective apparatus for an electric circuit, a circuit breaker, relay means for causing said circuit breaker to open in response to an abnormal condition of said circuit, said relay means including a winding energized in accordance with the current in said electric circuit, a shunt circuit normally connected to said winding, said shunt circuit including an admittance element, and means responsive to an over-current condition of said electric circuit for interrupting said shunt circuit, to thereby increase the sensitiveness of said relay means during over-current conditions of said electric circuit.

8. In protective apparatus for an electric circuit, a circuit breaker, power directional relay means for causing said circuit breaker to open in response to directional power flow in said circuit, said relay means including cooperating current and voltage windings and biasing means for preventing operation of said relay means except in response to a predetermined degree of energization of said windings, an admittance element normally connected in shunt to said current winding for reducing the energization thereof to thereby cause insensitive operation of said relay means during normal conditions of said circuit, and means responsive to an abnormal condition of said circuit for disconnecting said admittance element to thereby cause sensitive operation of said relay means during said abnormal condition.

9. In protective apparatus for an electric circuit, a circuit breaker, an induction disc relay for causing said circuit breaker to open in response to directional power flow in said circuit, said relay having a power responsive operator and biasing means for preventing operation of said relay except in response to a predetermined torque of said operator, means acting upon said operator for normally maintaining a predetermined low ratio of torque of said operator to power flow in said circuit to thereby cause insensitive operation of said relay during normal conditions of said circuit, and current responsive means for rendering said last mentioned means ineffective during an over-current condition of said circuit to thereby establish a predetermined high ratio of torque of said operator to power flow in said circuit during an over-current condition.

10. In protective apparatus for an electric circuit, a circuit breaker, an induction disc relay for causing said circuit breaker to open in response to directional power flow in said circuit, said relay having a power responsive operator connected to be energized in accordance with the power flow in said circuit and having biasing means for preventing operation of said relay except in response to a predetermined torque of said operator, means including an impedance element normally connected to said operator for maintaining a predetermined low ratio of torque of said operator to power flow in said circuit during normal conditions of said circuit, and means responsive to an abnormal condition of said circuit for rendering said last-mentioned means ineffective, to thereby establish a predetermined high ratio of torque of said operator to power flow in said circuit, whereby said relay operates with insensitive setting during normal conditions of said circuit and with sensitive setting during said abnormal condition.

GORDON ROSS MILNE.